United States Patent
Doyle

(10) Patent No.: US 10,637,025 B2
(45) Date of Patent: Apr. 28, 2020

(54) BATTERY VENT CAP

(75) Inventor: Michael A. Doyle, Holland, OH (US)

(73) Assignee: DOYLE MANUFACTURING, INC., Holland, OH (US)

( * ) Notice: Subject to any disclaimer, the term of this patent is extended or adjusted under 35 U.S.C. 154(b) by 181 days.

(21) Appl. No.: 13/557,814

(22) Filed: Jul. 25, 2012

(65) Prior Publication Data

US 2013/0034757 A1 Feb. 7, 2013

Related U.S. Application Data

(60) Provisional application No. 61/513,864, filed on Aug. 1, 2011.

(51) Int. Cl.
*H01M 2/12* (2006.01)

(52) U.S. Cl.
CPC ....... *H01M 2/1252* (2013.01); *H01M 2/1205* (2013.01); *H01M 2/1264* (2013.01); *H01M 2/1223* (2013.01)

(58) Field of Classification Search
CPC . H01M 2/1223; H01M 2/1229; H01M 2/1252
USPC ...................................... 429/53–56
See application file for complete search history.

(56) References Cited

U.S. PATENT DOCUMENTS

| | | |
|---|---|---|
| 1,010,695 A | 12/1911 | Sloan |
| 1,459,121 A | 6/1923 | Van De Wiel |
| 1,469,119 A | 9/1923 | Stallings |
| 2,570,123 A | 10/1951 | Heine |
| 3,038,954 A | 6/1962 | Pattison et al. |
| 3,392,060 A | 7/1968 | Favre |
| 3,907,605 A | 9/1975 | Melone |
| 3,915,752 A | 10/1975 | Gross |
| 3,992,226 A | 11/1976 | Godshalk |
| 4,113,925 A | 9/1978 | Kohler et al. |
| 4,186,247 A | 1/1980 | Mocas |
| 4,223,370 A | 9/1980 | Quere et al. |
| 4,317,868 A | 3/1982 | Spiegelberg |
| 4,477,542 A | 10/1984 | Braswell |
| 4,689,281 A | 8/1987 | Dandona et al. |
| 5,108,853 A | 4/1992 | Feres |
| 5,284,720 A | 2/1994 | Thuerk et al. |
| 5,525,438 A | 6/1996 | Kostrivas et al. |
| 5,766,936 A * | 6/1998 | Kayal ............... C12M 23/08 215/354 |
| 5,981,099 A | 11/1999 | Bourbeau |
| 6,432,573 B1 | 8/2002 | Oschmann |
| 6,554,025 B1 | 4/2003 | Fitter |
| 6,746,795 B2 | 6/2004 | Schwarz |
| 2004/0013936 A1 | 1/2004 | Barrett, Jr. |
| 2006/0141342 A1 | 6/2006 | Marconi et al. |
| 2010/0323229 A1 | 12/2010 | Campau |

* cited by examiner

*Primary Examiner* — Barbara L Gilliam
*Assistant Examiner* — Helen M McDermott
(74) *Attorney, Agent, or Firm* — Shumaker, Loop & Kendrick, LLP; James D. Miller

(57) ABSTRACT

A battery vent cap includes a cylindrical body having an upper portion and a lower portion. A pair of diametrically opposed, radially outwardly extending bayonet tabs is formed on the lower portion. The bayonet tabs permit an installation of the vent cap into a vent port of a battery cover without rotational movement thereof and a removal of the vent cap from the vent port with less than about 180 degrees rotational movement.

20 Claims, 1 Drawing Sheet

BATTERY VENT CAP

CROSS-REFERENCE TO RELATED APPLICATION

This application claims the benefit of U.S. Provisional Patent Application Ser. No. 61/513,864 filed Aug. 1, 2011, the entire disclosure of which is hereby incorporated herein by reference.

FIELD OF THE INVENTION

The invention relates to batteries, and more particularly to a battery vent cap which is easily installed and removed.

BACKGROUND OF THE INVENTION

Many devices use a quarter-turn or bayonet-style attachment in applications where quick installation and removal are desired. For example, lead-acid batteries use this method of attachment for securing the vent caps within the vent ports. The same attachment method is often used in the manufacture of battery watering systems to mount the watering valves to the vent ports.

A typical prior art battery cover assembly for a battery includes a battery vent cap and a battery cover having a vent port. The vent cap and the vent port each include a pair of diametrically opposed bayonet tabs. The tabs have substantially similar lead angles. The individual vent cap is manually tightened within the vent port as the vent cap is rotated 90 degrees clockwise (quarter-turn method) by field personnel. This tightening secures the vent cap and provides a seal between a flange of the vent cap and a rim of the vent port. The seal prevents a migration of battery acid out of the battery. The vent cap can be easily rotated 90° counterclockwise by the user to remove the vent cap from the vent port for routine battery maintenance and inspections. The described bayonet attachment system has been used for decades and continues to be a common system of attachment for battery vent caps and watering systems on deep-cycle batteries.

Recently, a push-in style of cap has been introduced, particularly for caps which are part of battery watering systems. The push-in style of construction enables the cap to be pushed into place without substantial rotation. Accordingly, an installation of the cap is relatively easy compared to the prior quarter-turn method of installation. The push-in caps are being used on an assembly line by battery manufacturers and manufacturers of battery-powered equipment such as golf cart manufacturers, for example. The caps also enable faster installation of battery watering systems. After the caps are pushed into place, the caps can rotate 360 degrees within the vent port, which is helpful in aligning connection ports on the caps with watering system tubing.

The push-in caps are tightly fitted into the vent port to improve a seal therebetween and prevent the cap from dislodging as the battery cover flexes during use. The tight fit also assists in maintaining an appropriate seal over a wide range of temperatures and vibrations experienced by the battery. The push-in caps, however, are not without problems. For example, to remove the push-in caps from the vent ports for routine battery maintenance, field personnel use screwdrivers or channel-lock wrenches to pry out or pull out the caps, potentially damaging the battery cover and/or the caps. It also can be hazardous because it involves the use of a metal tool on the battery cover, which can cause dangerous sparks that can trigger explosions. Accordingly, the benefits provided by the prior art push-in caps are offset by the difficult, potentially damaging, and hazardous removal of the caps for routine battery maintenance.

It is an object of the present invention to produce a battery vent cap which is easily installed and removed.

SUMMARY OF THE INVENTION

In concordance and agreement with the present invention, a battery vent cap which is easily installed and removed, has surprisingly been discovered.

In one embodiment, a battery vent cap, comprises: a main body configured to facilitate installation thereof into a battery cover and securing thereto without rotational movement thereof and removal thereof from the battery cover with less than about 180 degrees rotational movement thereof.

In another embodiment, a battery vent cap, comprises: a main body including a plurality of radially outwardly extending tabs formed thereon, the tabs configured to facilitate installation thereof into a battery cover and securing thereto without rotational movement thereof and removal thereof from the battery cover with less than about 180 degrees rotational movement thereof.

In yet another embodiment, a battery assembly, comprises: a battery cover having at least one vent port formed thereon, wherein the at least one vent port includes a plurality of radially outwardly extending tabs formed thereon; and a vent cap including a main body having a plurality of radially outwardly extending tabs formed thereon, wherein the tabs of the vent cap releasably engage the tabs of the battery cover without rotational movement of the vent cap to facilitate installation of the vent cap into the battery cover, and the tabs of the vent cap disengage the tabs of the battery cover with less than about 180 degrees rotational movement of the vent cap to facilitate removal of the vent cap from the battery cover.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
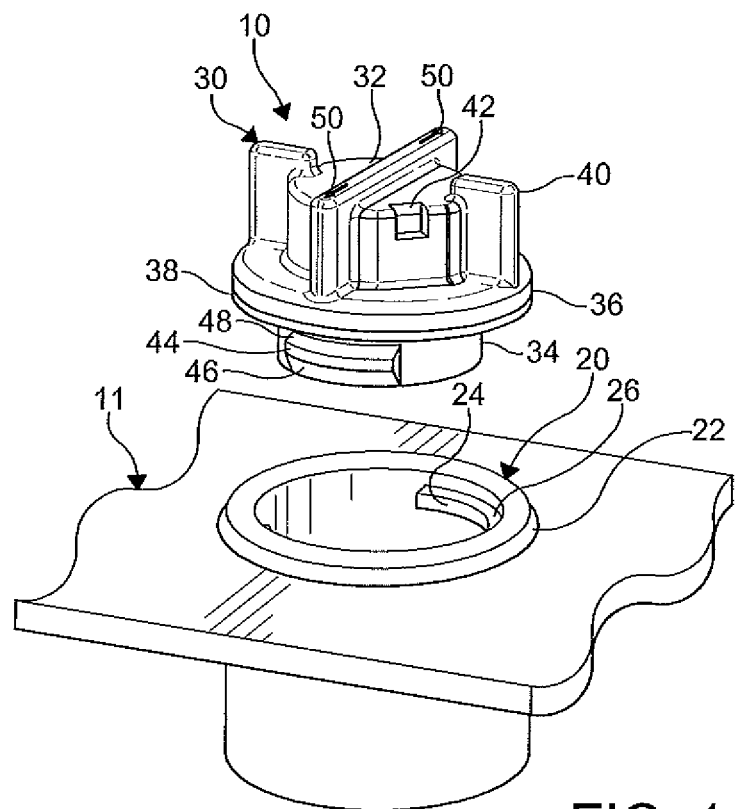
FIG. 1 is a fragmentary side perspective view of a battery cover assembly including a battery cover and a removed vent cap according to an embodiment of the present invention.
Figure 2:
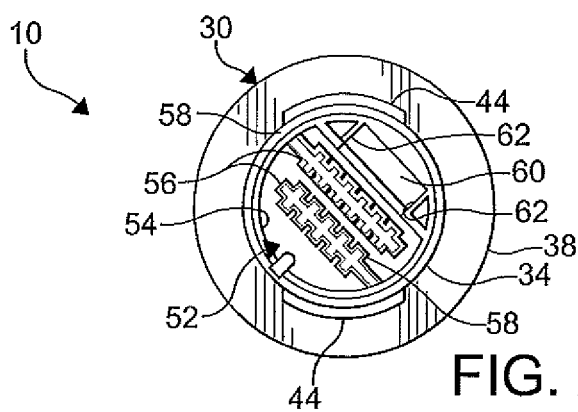
FIG. 2 is a bottom plan view of the vent cap illustrated in FIG. 1.
Figure 3:
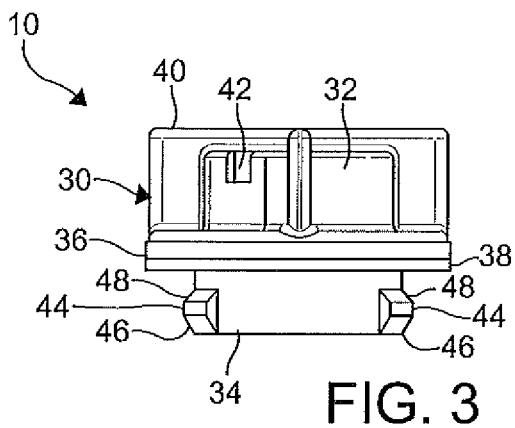
FIG. 3 is a front elevational view of the vent cap illustrated in FIGS. 1-2, wherein the vent cap includes a pair of diametrically opposed bayonet tabs having an inclined upper surface and an inclined lower surface.
Figure 4:
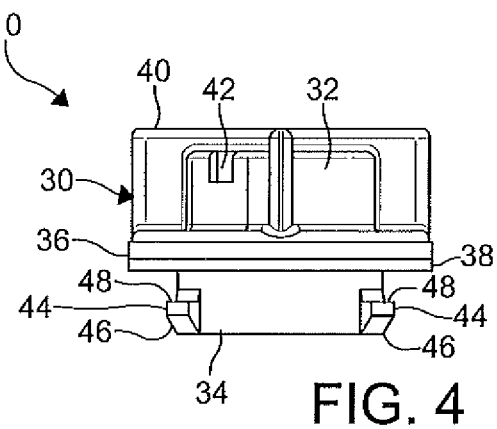
FIG. 4 is a front elevational view of a vent cap, wherein the vent cap includes a pair of diametrically opposed bayonet tabs having a substantially planar upper surface and an inclined lower surface.

FIG. 1-4 shows a vent cap 10 for a battery (not shown) according to an embodiment of the present invention. The vent cap 10 cooperates with a cover 11 for the battery. It is understood that the cover 11 can be any suitable cover 11 as desired to form a substantially fluid-tight seal with a battery (not shown). The cover 11 includes at least one vent port 20 formed therein. In certain embodiments, a plurality of vent ports 20 can be formed in the cover 11 in any pattern or configuration as desired such as in a diagonal configuration or a linear configuration, for example. As shown, the vent port 20 includes a rim 22 and a pair of diametrically opposed, radially inwardly extending bayonet tabs 24. In a non-limiting example, each of the bayonet tabs 24 includes a substantially planer upper surface 26 and a substantially planar lower surface (not shown). The cover 11 may also include other features and components necessary for operation of the battery such as a pair of terminals (not shown) and a pair of mounting structures (not shown), for example.

As illustrated, the vent cap 10 includes a cylindrical main body 30. The body 30 can be formed from any suitable material as desired such as a plastic material, for example. As shown, the body 30 includes an upper portion 32 and a lower portion 34. Intermediate the upper portion 32 and the lower portion 34 of the body 30 is a radially outwardly extending flange 36. A lower surface of the flange 36 is in abutting contact with a sealing member 38 which encircles the lower portion 34.

The upper portion 32 includes a means 40 for gripping and rotating the vent cap 10. Various means 40 for gripping and rotating the vent cap 10 can be employed such as tabs, knurls, spanner recesses, or any other structure which facilitates a rotational movement of the vent cap 10, for example. An outlet 42 is formed in the upper portion 32 to provide fluid communication between an interior of the battery and the ambient air.

In a non-limiting example, the lower portion 34 of the body 30 has a diameter slightly less than a diameter between bayonet tabs 24 of the vent port 20. A pair of diametrically opposed, radially outwardly extending bayonet tabs 44 is formed on the lower portion 34. Each of the bayonet tabs 44 extends about the lower portion 34 of the body 30 substantially parallel to the lower surface of the flange 36. As illustrated, the bayonet tabs 44 extend about 90 degrees around the lower portion 34 of the body 30. The bayonet tabs 44 may be formed with a substantially inclined lower surface 46 and a substantially inclined upper surface 48. Each of the inclined lower surface 46 and the inclined upper surface 48 slopes from a portion of the bayonet tabs 44 adjacent the lower portion 34 of the body 30 towards a radial outermost portion of the bayonet tabs 44. The inclined upper surface 48 facilitates movement of the bayonet tabs 44 past the bayonet tabs 24 of the vent port 20 during an installation and removal of the vent cap 10 from the cover 11. Alternatively, the bayonet tabs 44 may be formed with a substantially planar upper surface 48 to increase surface contact between the bayonet tabs 44 and the bayonet tabs 24 of the vent port 20, and thereby improve retention of the vent cap 10 in the vent port 20. It is understood that the bayonet tabs 44 of the vent cap 10 could be formed on the vent port 20 and the bayonet tabs 24 of the vent port 20 could be formed on the body 30 of the vent cap 10 if desired. A pair of indicators 50 (i.e. arrows) corresponding to a location of the bayonet tabs 44 on a perimeter of the lower portion 34 may be formed on the upper portion 32. The indicators 50 facilitate alignment of the bayonet tabs 44 with the bayonet tabs 24 of the vent port 20 during the installation and removal of the vent cap 10 from the cover 11.

The lower portion 34 of the body 30 further includes a centrally disposed cavity 52 formed by an inner cylindrical wall 54 of the body 30. A plurality of alternating partitions 56 forms a flow path in the cavity 52 for vent gases from the battery. As illustrated, the partitions 56 form a substantially continuous flow path having a generally serpentine shape. Each of the partitions 56 includes a plurality of spaced apart baffles 58 which cooperate to form a labyrinth to maximize an overall length of the flow path through the partitions 56. As shown, the baffles 58 of one partition 56 are offset from the baffles 58 of an adjacent partition 56. The partitions 56 and baffles 58 provide a large surface area for condensation of a condensable material such as electrolytes, for example, present in the vent gases from the battery. It is understood that the partitions 56 can either be formed separately and inserted into the cavity 52 or integrally formed with the body 30.

A hydrophobic barrier 60 is disposed within the cavity 52 to cover the outlet 42. A pair of spaced apart guide walls 62 receives, positions, and holds the barrier 60 in place adjacent the inner cylindrical wall 54. The barrier 60 is formed from any suitable material antagonistic to water such as sintered polypropylene, for example. Although a planar barrier 60 is shown, it is understood that the barrier 60 can have any shape and size as desired such as an arcuate shape which conforms to the inner cylindrical wall 54, for example. A removable cover (not shown) may be provided to enclose the cavity 52. The cover includes a notch which forms an inlet to provide fluid communication between the interior of the battery and the cavity 52.

During installation of the vent cap 10 within the cover 11, the vent cap 10 is aligned with the vent port 20 of the cover 11. More particularly, using the indicators 50, the bayonet tabs 44 of the vent cap 10 are aligned with the respective bayonet tabs 24 of the vent port 20. The lower portion 34 of the body 30 of the vent cap 10 is urged downwardly into the vent port 20 without rotational movement thereof. As the body 30 of the vent cap 10 is inserted into the vent port 20, the bayonet tabs 44 of the vent cap 10 slidingly contact the bayonet tabs 24 of the vent port 20. In a non-limiting example, the substantially inclined lower surface 46 of the bayonet tabs 44 enables the bayonet tabs 44 to pass beyond the bayonet tabs 24 of the vent port 20. The vent cap 10 is urged downward until the upper surface 48 of the bayonet tabs 44 is located under the lower surface of the bayonet tabs 24 of the vent port 20 to secure the vent cap 10 in the cover 11 without rotational movement thereof. When the vent cap 10 is secured and in an engaged position, the sealing member 38 is compressed between the flange 36 of the vent cap 10 and the rim 22 of the vent port 20 to form a substantially fluid-tight seal.

The vent cap 10 condenses electrolytes from gases being vented from the battery. The vent gases enter the inlet formed by the notched cover disposed within the cavity 52 and are directed through the flow path in the labyrinth formed by the partitions 56 and the baffles 58. The surface area created by the labyrinth provides an efficient condensing surface which causes electrolyte droplets to condense out of the vent gases and drain back into the battery, thereby minimizing required electrolyte balancing. The removal of the electrolyte from the vent gases also helps keep the top surfaces of the battery clean and eliminates dangerous and irritating fumes. Other liquid and solid contaminants present in the vent gases will also be removed. The vent gas then travels through the barrier 60 and out of the vent cap 10 through the outlet 42.

When removal of the vent cap 10 from the vent port 20 is desired such as for battery maintenance or service, for example, the vent cap 10 is disengaged from the vent port 20. More particularly, force is applied to the means 40 for gripping and rotating the vent cap 10. The applied force causes a rotational movement of the vent cap 10. As the vent cap 10 rotates, the bayonet tabs 44 of the vent cap 10 slidingly contact, and ultimately disengage, the bayonet tabs 24 of the vent port 20. The vent cap 10 shown rotates less than about 180 degrees in either a counter-clockwise direction or a clockwise direction to disengage the vent cap 10 from the vent port 20. In certain embodiments, the vent cap 10 rotates no more than 90 degrees in either the counter-clockwise direction or the clockwise direction to disengage the vent cap 10 from the vent port 20. It is understood, however, that the vent cap 10 can be configured to rotate in only the counter-clockwise direction or clockwise direction if desired to disengage the vent cap 10 from the vent port 20. In a non-limiting example, the substantially inclined upper surface 48 of the bayonet tabs 44 enables the bayonet tabs 44 to pass beyond the bayonet tabs 24 of the vent port 20 and release before the vent cap 10 is rotated the entire 90 degrees. In another non-limiting example, the substantially planar upper surface 48 of the bayonet tabs 44 enables the bayonet tabs 44 to pass beyond the bayonet tabs 24 of the vent port 20 and release once the vent cap 10 is rotated the entire 90 degrees. Once the bayonet tabs 44 are released, the vent cap 10 is removed from the vent port 20 by an axial movement thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery vent cap, comprising:
   a main body configured to facilitate installation thereof into a battery cover and securing thereto without rotational movement thereof and removal thereof from the battery cover with less than 180 degrees and greater than zero degrees rotational movement thereof;
   wherein the main body includes an upper portion differentiated from a lower portion by a radially outwardly extending flange, wherein the lower portion has a bottom surface defining a continuous circular edge, the lower portion including a pair of tabs radially outwardly extending from the lower portion and diametrically opposed from each other, each of the pair of tabs having an upper surface and a lower surface, a first edge of the upper surface of each of the pair of tabs and a second edge of the lower surface of each of the pair of tabs abutting an outer surface of the lower portion, wherein the first edge and the second edge are parallel to a lower surface of the flange, wherein the second edge aligns with and abuts the continuous circular edge, and wherein the lower surface of each of the pair of tabs is continuous and slopes with respect to the outer surface of the lower portion from the second edge thereof to a radial outermost portion thereof, wherein a cross-sectional shape of each of the pair of tabs is a trapezoid.

2. The battery vent cap of claim 1, wherein the main body is configured to facilitate the removal thereof from the battery cover with up to 90 degrees rotational movement in an entirely clockwise direction, and wherein the main body is configured to facilitate the removal thereof from the battery cover with up to 90 degrees rotational movement in an entirely counter-clockwise direction thereof.

3. The battery vent cap of claim 1, wherein the main body includes at least one indicator corresponding to, aligning with, and identifying a location of one of the pair of tabs formed on the main body, and wherein the at least one indicator is an indicia formed on a surface of the main body.

4. The battery vent cap of claim 3, wherein the indicia is an arrow.

5. The battery vent cap of claim 1, wherein the upper surface of each of the pair of tabs is substantially inclined, wherein the upper surface of each of the pair of tabs slopes in respect of the outer surface of the lower portion from the first edge thereof to a radial outermost portion thereof, wherein the cross-sectional shape of each of the pair of tabs is an acute trapezoid.

6. The battery vent cap of claim 1, wherein the upper surface of each of the pair of tabs is substantially planar.

7. The battery vent cap of claim 1, wherein the main body includes a means for at least one of gripping and rotating the vent cap.

8. The battery vent cap of claim 1, wherein the lower portion of the main body includes a centrally disposed cavity formed in a bottom portion thereof and defined by an inner cylindrical wall of the main body, wherein a plurality of alternating partitions form a flow path in the cavity.

9. The battery vent cap of claim 8, wherein each of the partitions includes a plurality of spaced apart baffles.

10. The battery vent cap of claim 9, wherein the baffles of one of the partitions are offset from the baffles of an adjacent one of the partitions.

11. The battery vent cap of claim 8, wherein a hydrophobic barrier is disposed within the cavity to cover an outlet formed in the upper portion of the main body, the outlet providing fluid communication between an interior of the battery cover and ambient air, and wherein a pair of spaced apart guide walls receives the hydrophobic barrier in a position adjacent the inner cylindrical wall.

12. The battery vent cap of claim 1, wherein the pair of tabs is configured to permit rotation of the battery vent cap in a clockwise direction and a counter-clockwise direction to disengage the battery vent cap from the battery cover when installed and secured to the battery cover.

13. A battery vent cap, comprising:
    a main body including a plurality of radially outwardly extending tabs formed on a lower portion thereof, wherein the lower portion has a bottom surface defining a continuous circular edge, the lower portion configured for insertion into a vent port of a battery cover, the tabs configured to facilitate installation of the main body into the battery cover and securing thereto without rotational movement thereof and removal thereof from the battery cover with less than 180 degrees and greater than zero degrees rotational movement in an entirely clockwise direction, and wherein the tabs are configured to facilitate removal of the main body from the battery cover with less than 180 degrees and greater than zero degrees rotational movement in an entirely counter-clockwise direction thereof; and
    each of the tabs including a single continuous substantially inclined lower surface, wherein the inclined lower surface extends from and slopes in respect of an outer surface of the lower portion from the continuous circular edge to a radial outermost portion of the tab, wherein a cross-sectional shape of each of the tabs is a trapezoid.

14. The battery vent cap of claim 13, wherein the main body is configured to facilitate the removal thereof from the battery cover with up to 90 degrees rotational movement in the entirely clockwise direction thereof.

15. The battery vent cap of claim 13, wherein the main body includes at least one indicator corresponding to a location of at least one of the tabs formed on the lower portion of the main body.

16. The battery vent cap of claim 13, wherein each of the tabs has a substantially inclined upper surface sloping in respect of the outer surface of the lower portion from a portion of the tabs adjacent the lower portion to the radial outermost portion of the tabs.

17. The battery vent cap of claim 13, wherein at least one of the tabs has a substantially planar upper surface.

18. The battery vent cap of claim 13, wherein the main body includes a means for at least one of gripping and rotating the vent cap.

19. A battery assembly, comprising:
a battery cover having at least one vent port formed thereon, wherein the at least one vent port includes a pair of diametrically opposed radially outwardly extending tabs formed thereon; and
a vent cap including a main body having a pair of diametrically opposed radially outwardly extending tabs formed thereon, wherein the main body has a bottom surface defining a continuous circular edge, wherein each of the tabs of the vent cap longitudinally align and slidingly engage one of the tabs of the battery cover without rotational movement of the vent cap to facilitate installation of the vent cap into the battery cover, and the tabs of the vent cap disengage the tabs of the battery cover and the vent cap disengages the at least one vent port with less than 90 degrees and greater than zero degrees rotational movement of the vent cap to facilitate removal of the vent cap from the battery cover, each of the tabs of the vent cap including a substantially inclined lower surface and a substantially inclined upper surface, a first edge of the upper surface of each of the tabs of the vent cap and a second edge of the lower surface of each of the tabs of the vent cap abutting an outer surface of the main body, wherein the first edge and the second edge of each of the tabs of the vent cap are parallel to the continuous circular edge, wherein the second edge of each of the tabs of the vent cap aligns with and abuts the continuous circular edge, wherein the inclined lower surface of each of the tabs of the vent cap slopes in respect of the outer surface of the main body from adjacent the second edge of a respective one of the tabs of the vent cap to a radial outermost portion of the respective one of the tabs of the vent cap, wherein the inclined upper surface of each of the tabs of the vent cap slopes in respect of the outer surface of the main body from the first edge of the respective one of the tabs of the vent cap to a radial outermost portion of the respective one of the tabs of the vent cap, and wherein the vent cap is rotatable in an entirely clockwise direction to disengage the tabs of the vent cap from the tabs of the battery cover and to disengage the vent cap from the at least one vent port, wherein the vent cap is rotatable in an entirely counter-clockwise direction to disengage the tabs of the vent cap from the tabs of the battery cover and to disengage the vent cap from the at least one vent port, and wherein the vent cap disengages the tabs of the at least one vent port with only one continuous rotational movement.

20. The battery assembly of claim 19, wherein a portion of the tabs of the vent cap extends beyond the tabs of the battery cover in respect of a longitudinal direction of the vent cap to disengage the tabs of the vent cap from the tabs of the battery cover.

\* \* \* \* \*